(12) United States Patent
Khandani

(10) Patent No.: US 9,097,600 B2
(45) Date of Patent: Aug. 4, 2015

(54) SYSTEM AND METHOD FOR STRAIN AND ACOUSTIC EMISSION MONITORING

(71) Applicant: Mehdi Kalantari Khandani, Bethesda, MD (US)

(72) Inventor: Mehdi Kalantari Khandani, Bethesda, MD (US)

( * ) Notice: Subject to any disclaimer, the term of this patent is extended or adjusted under 35 U.S.C. 154(b) by 195 days.

(21) Appl. No.: 13/670,063

(22) Filed: Nov. 6, 2012

(65) Prior Publication Data

US 2013/0111994 A1    May 9, 2013

Related U.S. Application Data

(60) Provisional application No. 61/556,238, filed on Nov. 6, 2011.

(51) Int. Cl.

| | | |
|---|---|---|
| *G01H 11/00* | (2006.01) | |
| *G01H 11/08* | (2006.01) | |
| *G01L 1/00* | (2006.01) | |
| *G01L 1/22* | (2006.01) | |
| *G01M 5/00* | (2006.01) | |

(52) U.S. Cl.
CPC ........... *G01L 1/2256* (2013.01); *G01M 5/0008* (2013.01); *G01M 5/0025* (2013.01); *G01M 5/0033* (2013.01); *G01H 11/08* (2013.01)

(58) Field of Classification Search
CPC ..... G01M 5/008; G01M 5/0033; G01H 11/08
USPC ................... 73/587, 602, 760, 763, 775, 841
See application file for complete search history.

(56) References Cited

U.S. PATENT DOCUMENTS

| | | | | |
|---|---|---|---|---|
| 6,227,057 | B1 * | 5/2001 | Haas et al. .................... | 73/775 |
| 6,878,441 | B2 * | 4/2005 | Kondo et al. .......... | 428/355 RA |
| 7,077,011 | B2 * | 7/2006 | Johnson et al. ................. | 73/841 |
| 7,351,645 | B2 * | 4/2008 | Ohashi et al. ................. | 438/465 |
| 7,522,269 | B2 * | 4/2009 | Ogisu et al. ..................... | 356/32 |
| 7,875,313 | B2 * | 1/2011 | Blanchet et al. .............. | 427/282 |

* cited by examiner

*Primary Examiner* — J M Saint Surin

(57) ABSTRACT

A device is provided for monitoring strain and acoustic emission in an object. The device includes: a strain measurement portion operable to measure strain; an adhesive layer disposed on the strain measurement portion; and a peel-off mask disposed on the adhesive layer. In an example embodiment, the strain measurement portion includes a body, a transparent window portion, a strain measurement device and a signal processing portion. The body includes an attachment surface, wherein the adhesive layer is disposed on the attachment surface for attachment of the body to the object. The transparent window portion is arranged to enable viewing of a portion of the object through the body. The strain measurement device is disposed within the transparent window portion and is operable to generate a strain signal based on strain in the object. The signal processing portion is operable to generate a processed signal based on the strain signal.

17 Claims, 10 Drawing Sheets

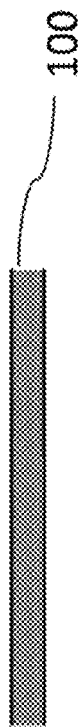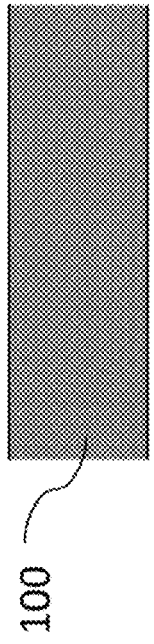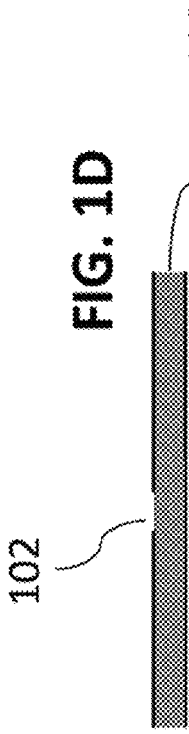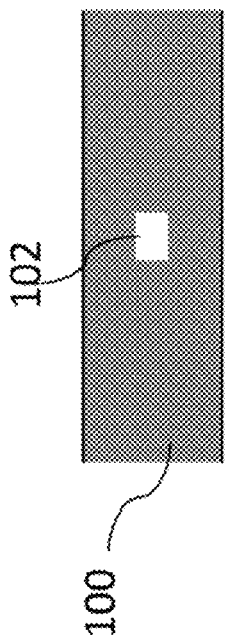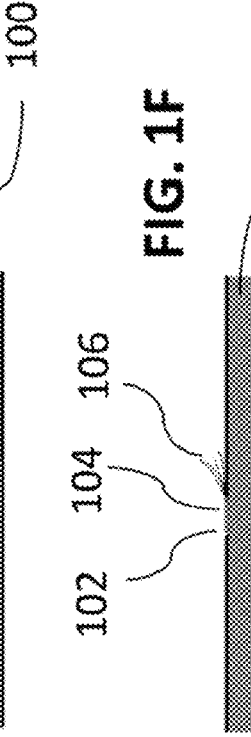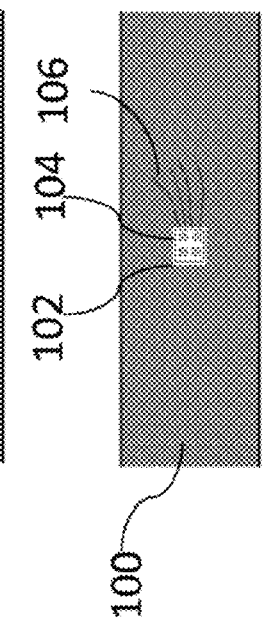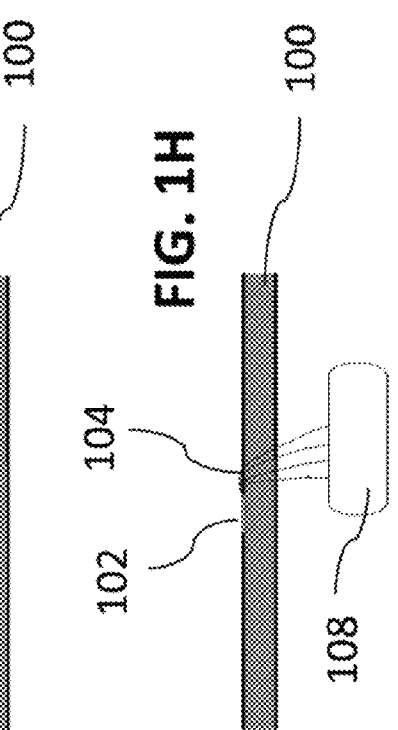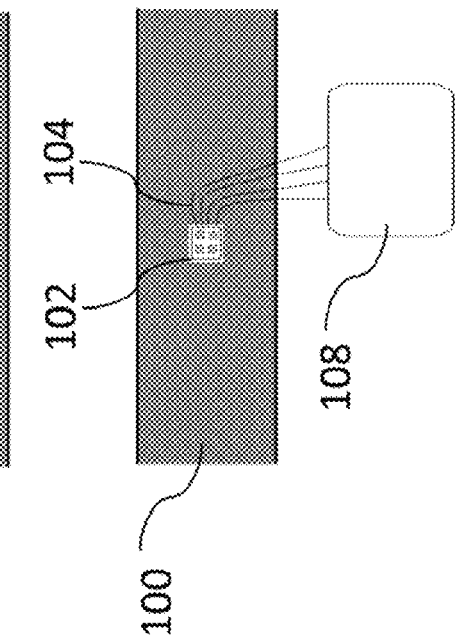

FIG. 2-C

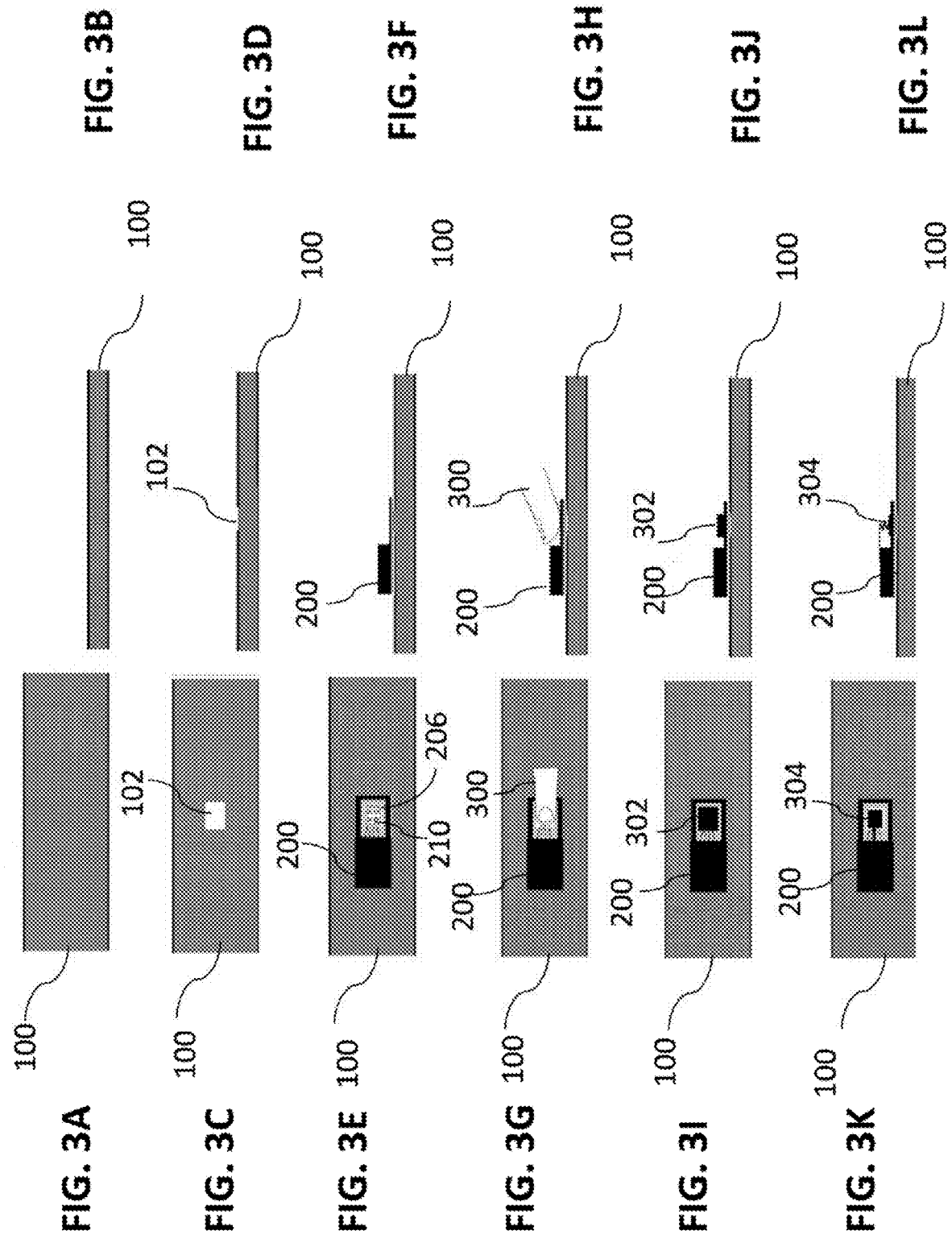

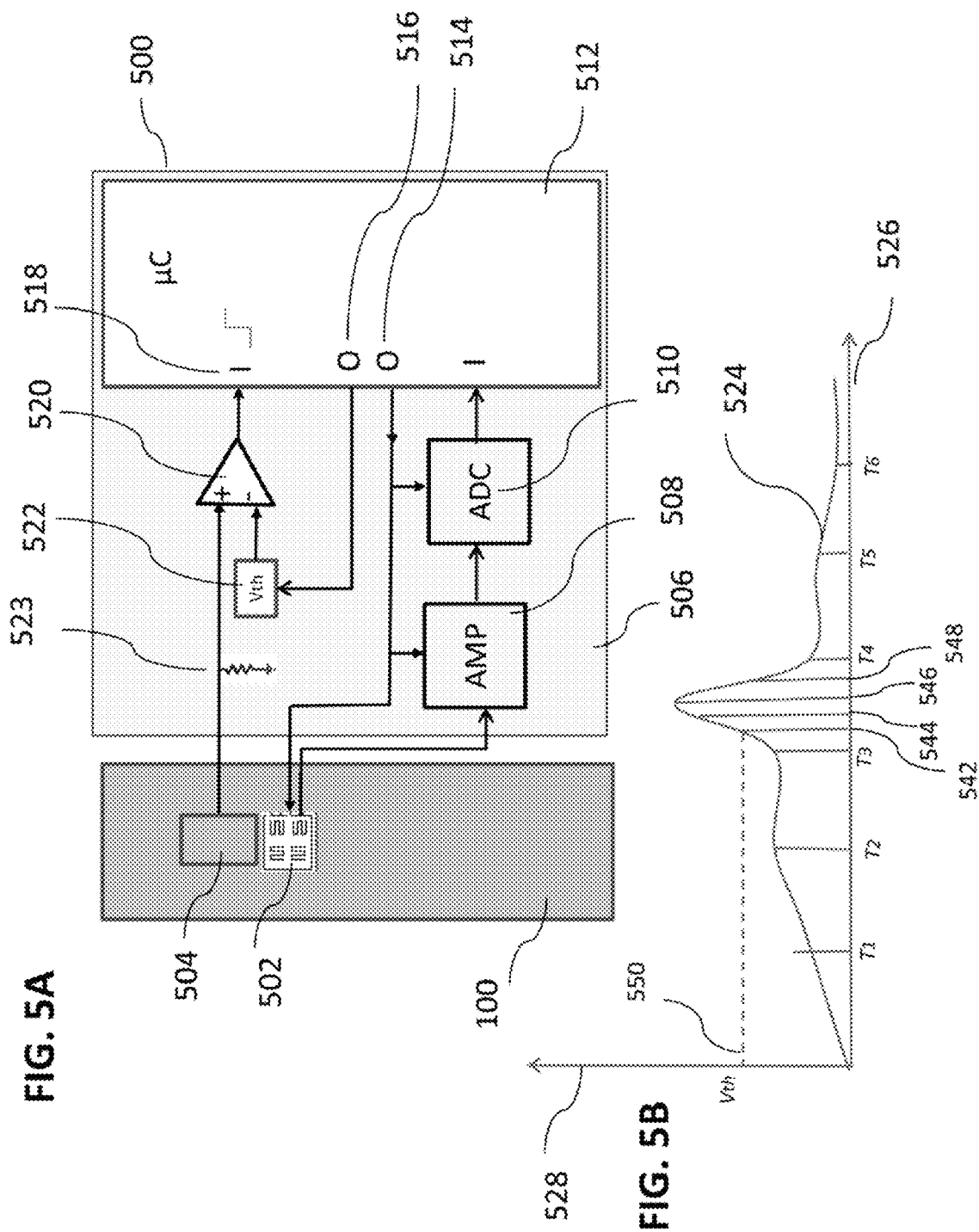

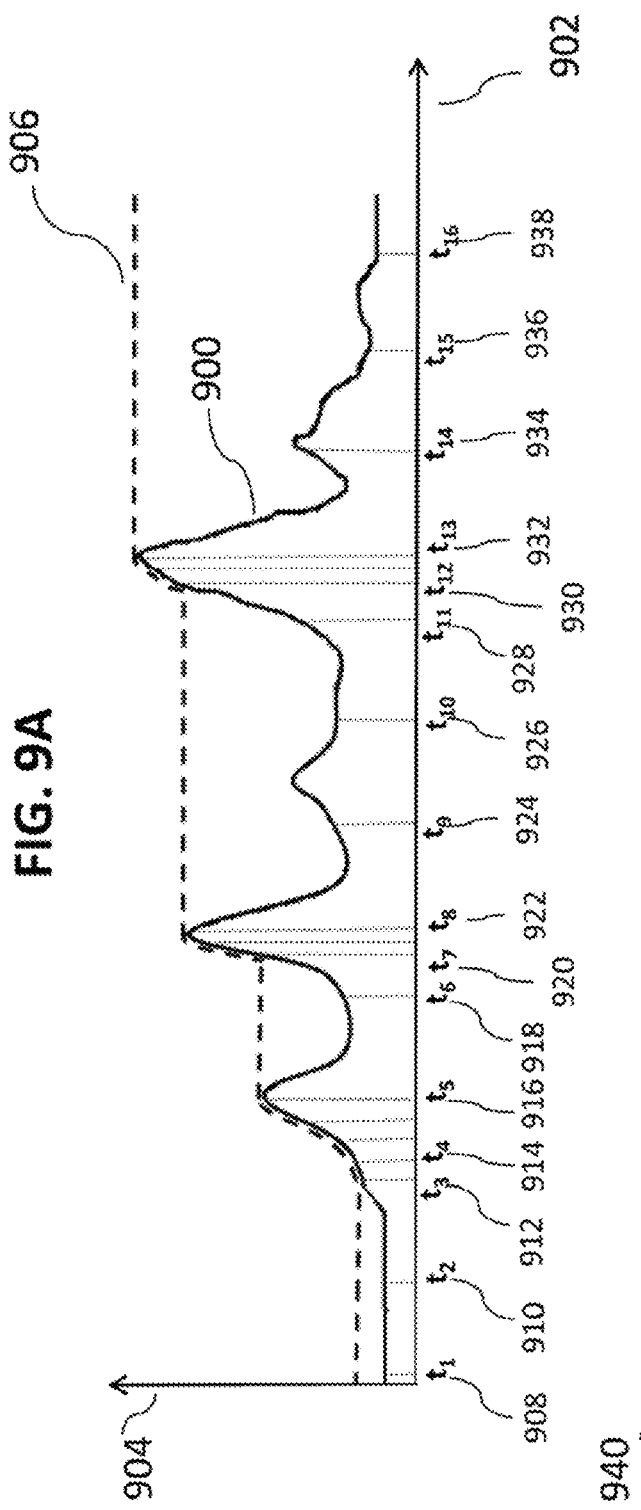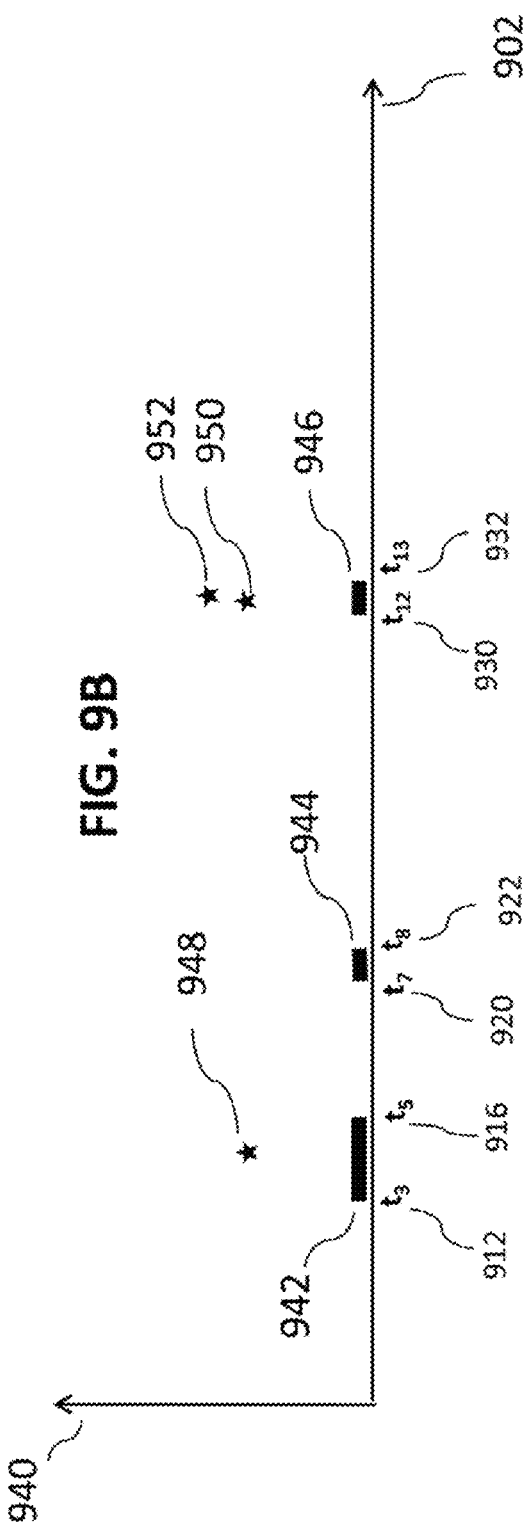

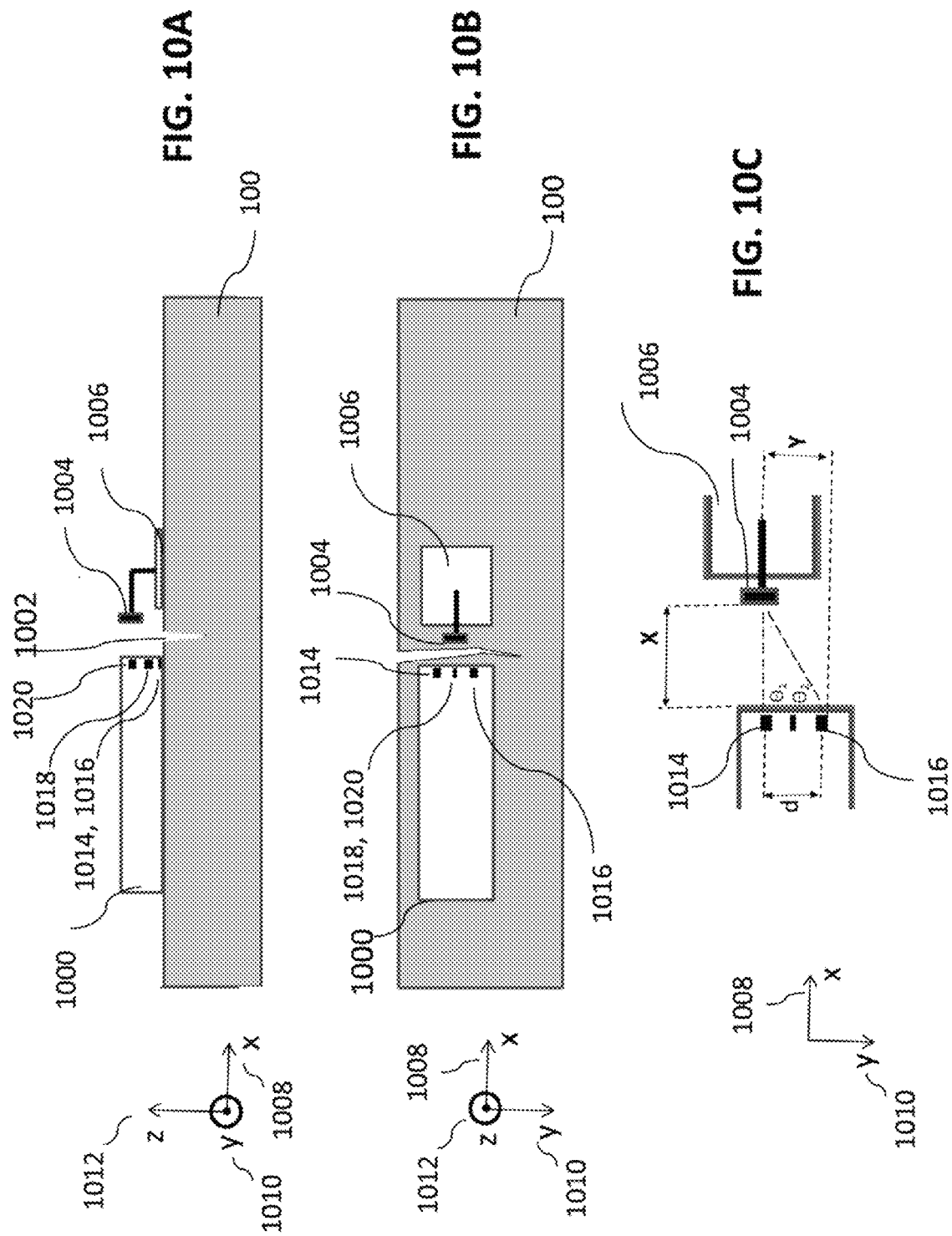

SYSTEM AND METHOD FOR STRAIN AND ACOUSTIC EMISSION MONITORING

The present application claims priority from U.S. Provisional Application No. 61/556,283 filed Nov. 6, 2011, the entire disclosures of which are incorporated herein by reference.

BACKGROUND

Monitoring integrity of structures—such as bridges, pipelines, machinery, and railways—requires monitoring various structural quantities at critical points. Of special interest, is to monitor strain, and acoustic emission. Acoustic emission waves are high frequency stress waves that are generated in materials at time of creation of growth of cracks.

Monitoring strain is a reflection of loading condition in a structure, and it is known that cracks are created in materials is highly correlated with strain, and often, excessive strain leads to creation and growth of cracks. Creation and growth of cracks causes propagation of acoustic emission waves in materials. Therefore, monitoring acoustic emission events is important to detect creation and growth of cracks.

Conventional methods for attaching foil strain gauges to objects are complicated and often, attachment is not easy especially when attachment is done in field (e.g., at a highway bridge site). A conventional system and method for monitoring strain in an object will now be described with reference to FIGS. 1A-H.

FIGS. 1A-H illustrate steps needed to attach a conventional strain gauge to an object 100.

FIGS. 1A-B show the top and the side views of object 100, respectively.

FIGS. 1C-D show top view and side view of object 100 after paint is removed from an area. To prepare for attachment of a conventional strain gauge, first, surface of object 100 is cleaned. If the surface of object 100 painted, paint is removed from an area 102 of object 100 to which the conventional strain gauge is intended to be attached.

FIGS. 1E-F show the top view and the side view of object 100 after a conventional strain sensing element 104 is attached thereto.

Strain sensing element 104 is attached to object 100 at exposed spot 102 using an adhesive. For strong bonding, often high quality adhesives are used for attaching strain sensing element 104 to the surface of object 100. In this example, exposed spot 102 is shown as having a rectangular shape. This non-limiting example shape and size is used merely for purposes of discussion.

FIGS. 1G-H show top view the side views of object 100 after electronic signal conditioner 108 is connected to strain sensing element 104. In this example, the conventional strain gauge includes a foil sensing element 104, wire leads 106 and an electronic signal conditioner 108. Electronic signal conditioner 108 includes an amplifier (not shown), a power supply (not shown) and control modules for measuring strain. Foil sensing element 104 is operable to detect strain in object 100 and generate a strain signal based on the detected strain. Wire leads 106 provide the strain signal from fail sensing element 104 to electronic signal conditioner 108 for processing.

A difficulty of conventional system and method for attaching a strain gauge to an object, as discussed above, is that often, the foil strain gauge element is extremely delicate and working with it requires extreme care. For example, approximate thickness of commercially available foil strain gauge elements is typically 50 micrometers. This thickness shows the degree of delicacy and sensitivity of strain sensing elements, and extreme care that should be practiced during the attachment in order to avoid permanent damage to the strain sensing element. While practicing the above attachment procedure may not be difficult in a laboratory environment, it is very difficult task in field, where attachment must be done at the place of a structure. An example of attachment of strain gauge in field is accurate strain measurement on massive structures or object such as highway bridges to monitor its structural integrity or loading conditions. Working with extremely delicate and sensitive foil strain gauges is a very difficult job in the field.

What is needed is a device and method that enables strain and acoustic emission monitoring for long times in situations that energy supply available to the device is limited. Example situations are when the device is battery operated, or when the energy consumption of the device is supplied through an ambient source such as a photovoltaic cell.

BRIEF SUMMARY

An aspect of the present invention is drawn to a device for monitoring strain in an object. The device includes: a strain measurement portion operable to measure strain in the object; an adhesive layer disposed on the strain measurement portion; and a peel-off mask disposed on the adhesive layer. In an example embodiment, the strain measurement portion includes a body, a transparent window portion, a strain measurement device and a signal processing portion. The body includes an attachment surface, wherein the adhesive layer is disposed for attachment of the body to the object. The transparent window portion is arranged to enable viewing of a portion of the object through the body. The strain measurement device is disposed within the transparent window portion and is operable to generate a strain signal based on strain in the object. The signal processing portion is operable to generate a processed signal based on the strain signal.

Another aspect of the present invention is drawn to a method of monitoring an object. The method includes: measuring, via a strain measurement device, a first strain of the object at a first time; generating, via the strain measurement device, a trigger signal when the first strain of the object exceeds a predetermined threshold; activating, via the trigger signal, a second strain measurement device; and measuring, via the second strain measurement device, a second strain of the object at a second time.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings:

FIGS. 1A-B show the top and the side views of an object, respectively; FIGS. 1C-D show top view and side view of the object after paint is removed from an area; FIGS. 1E-F show the top view and the side view of the object of after a conventional strain sensing element is attached thereto; FIGS. 1G-H show top view and side view of the object after an electronic signal conditioner is attached to a strain sensing element;

Figure 2B:
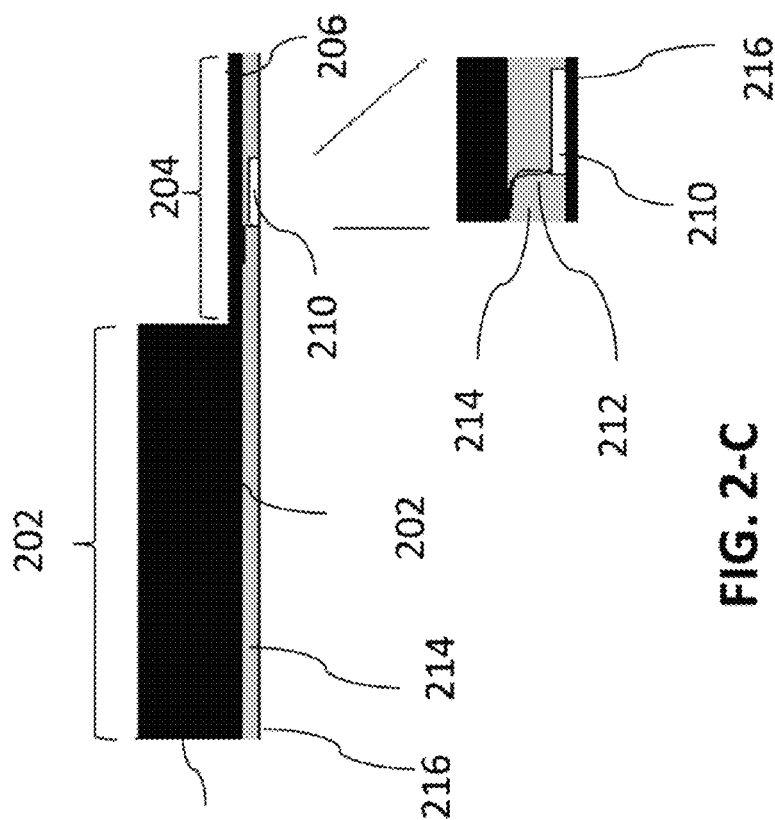
Figure 2A:
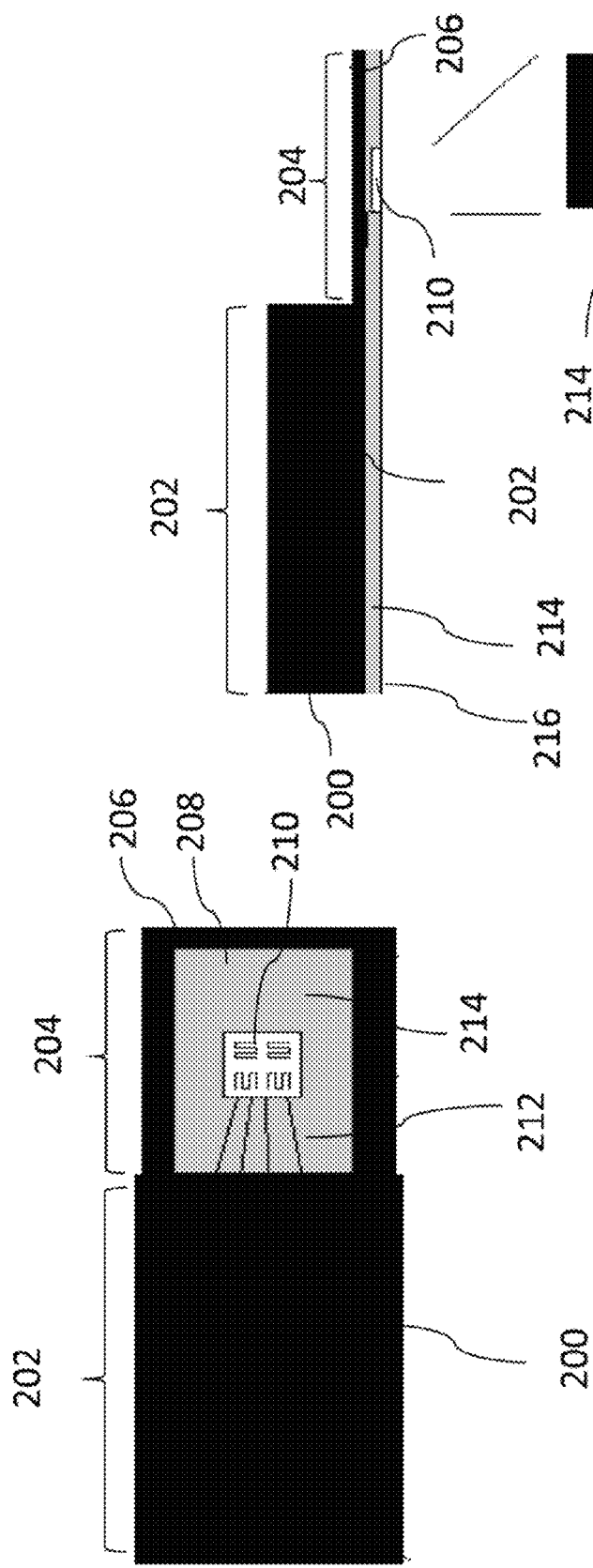
Figure 4A:
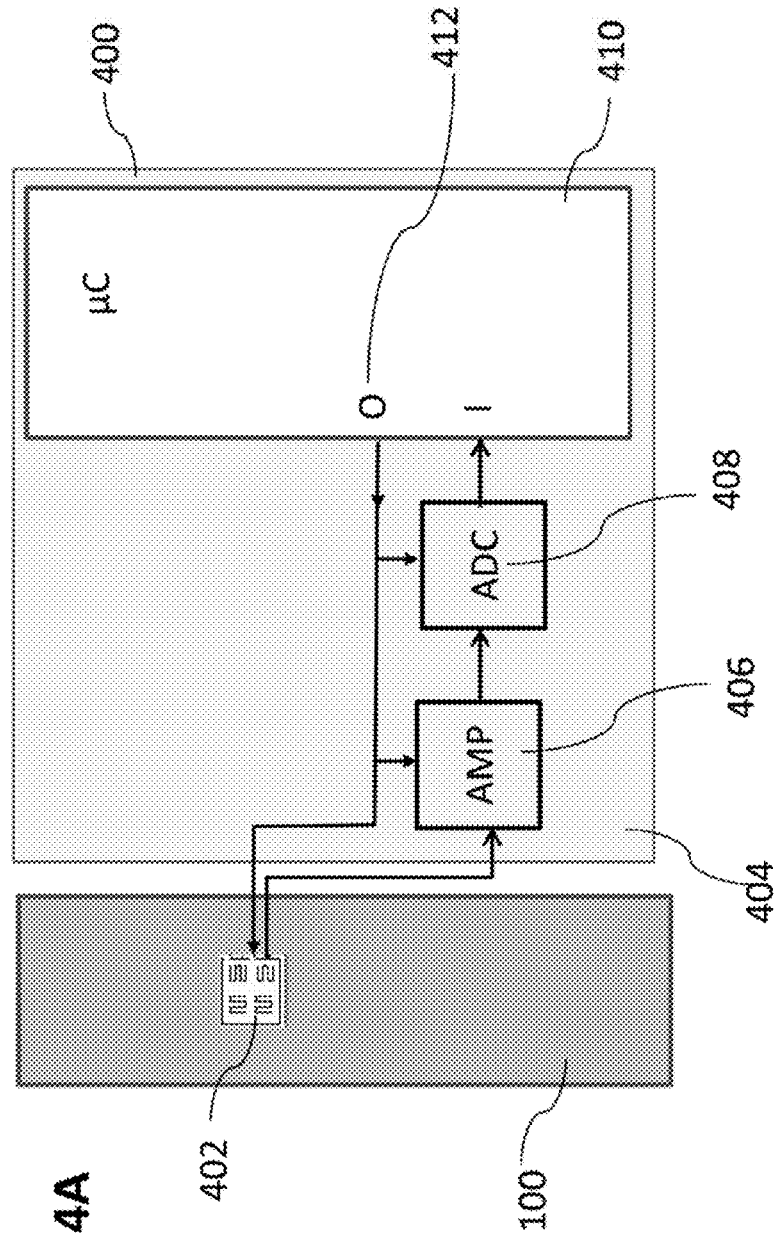
Figure 4B:
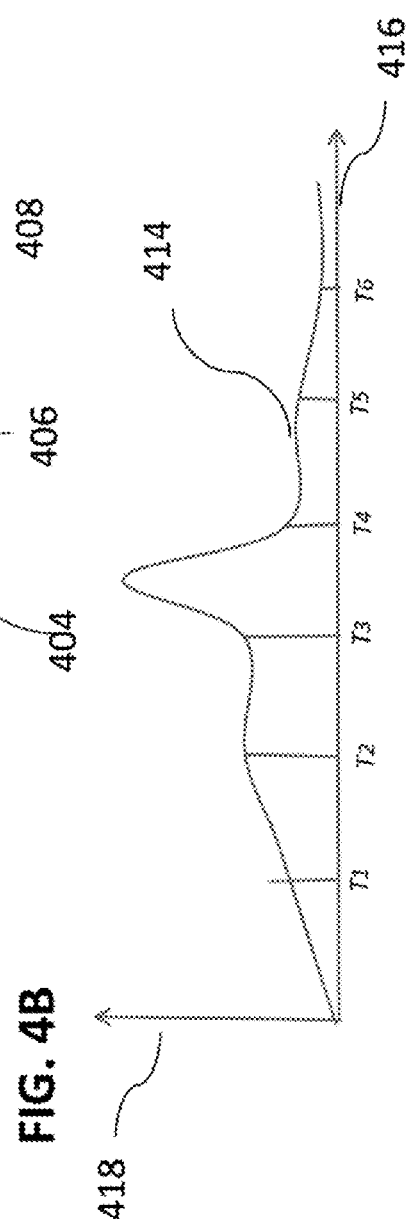
Figure 6:
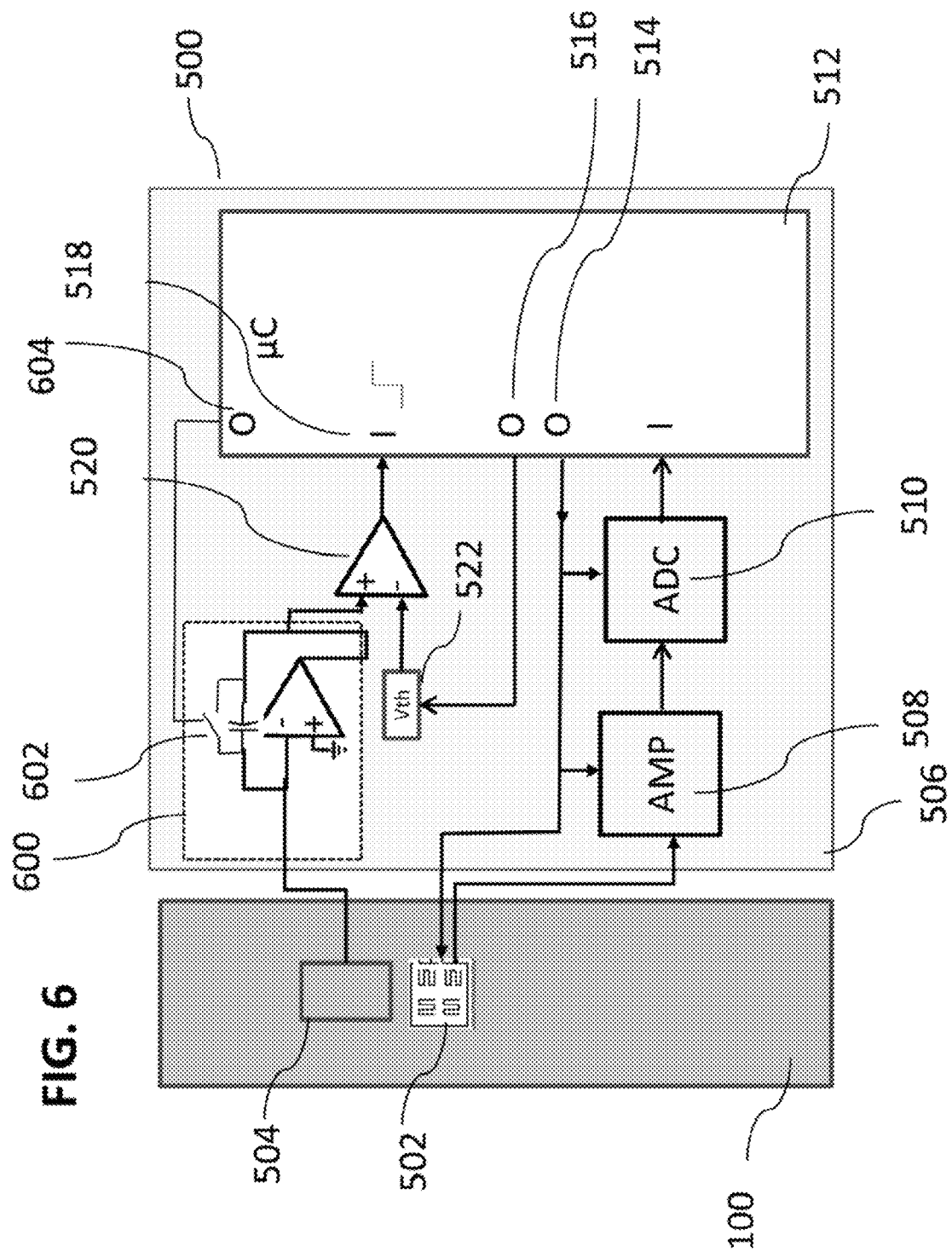
Figure 7:
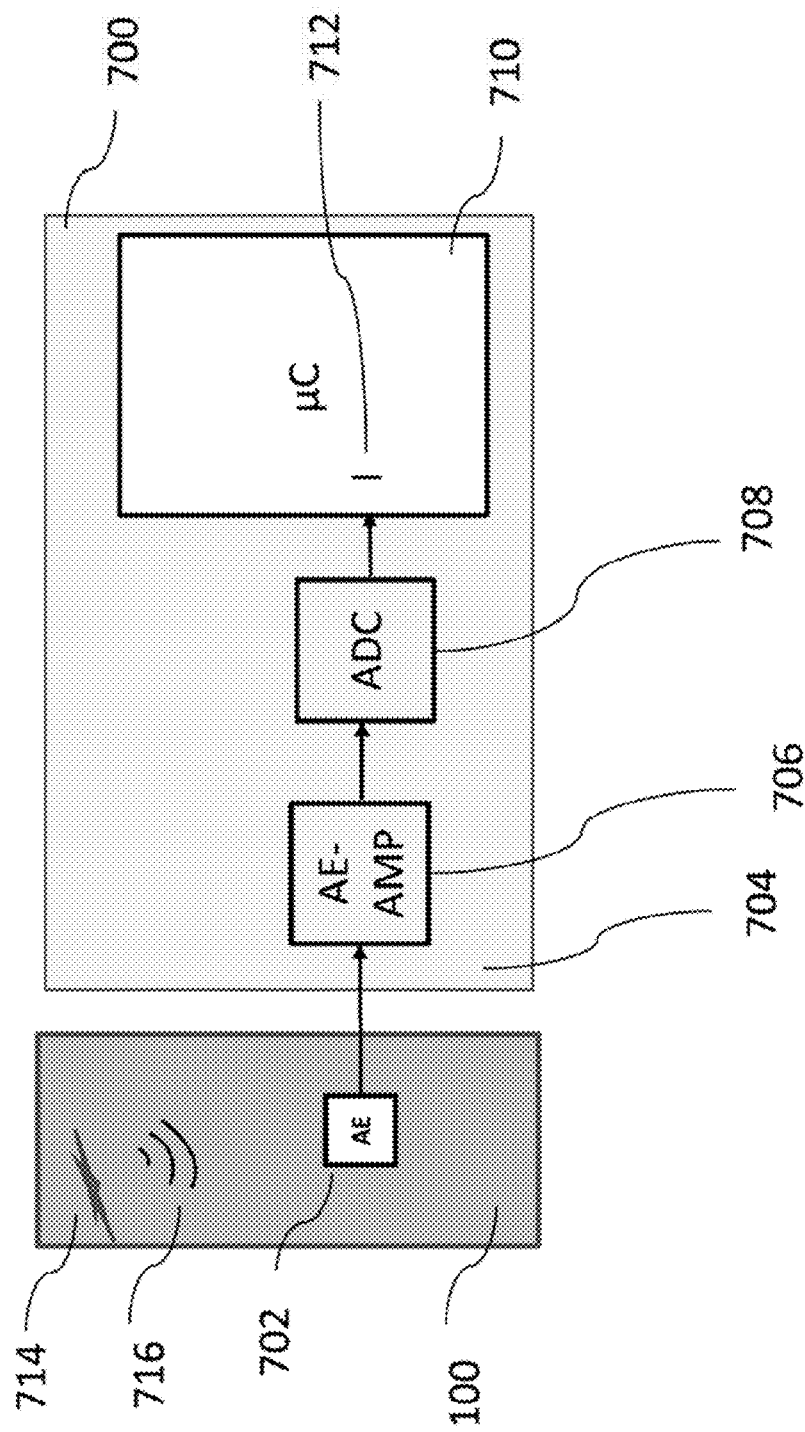
Figure 8:
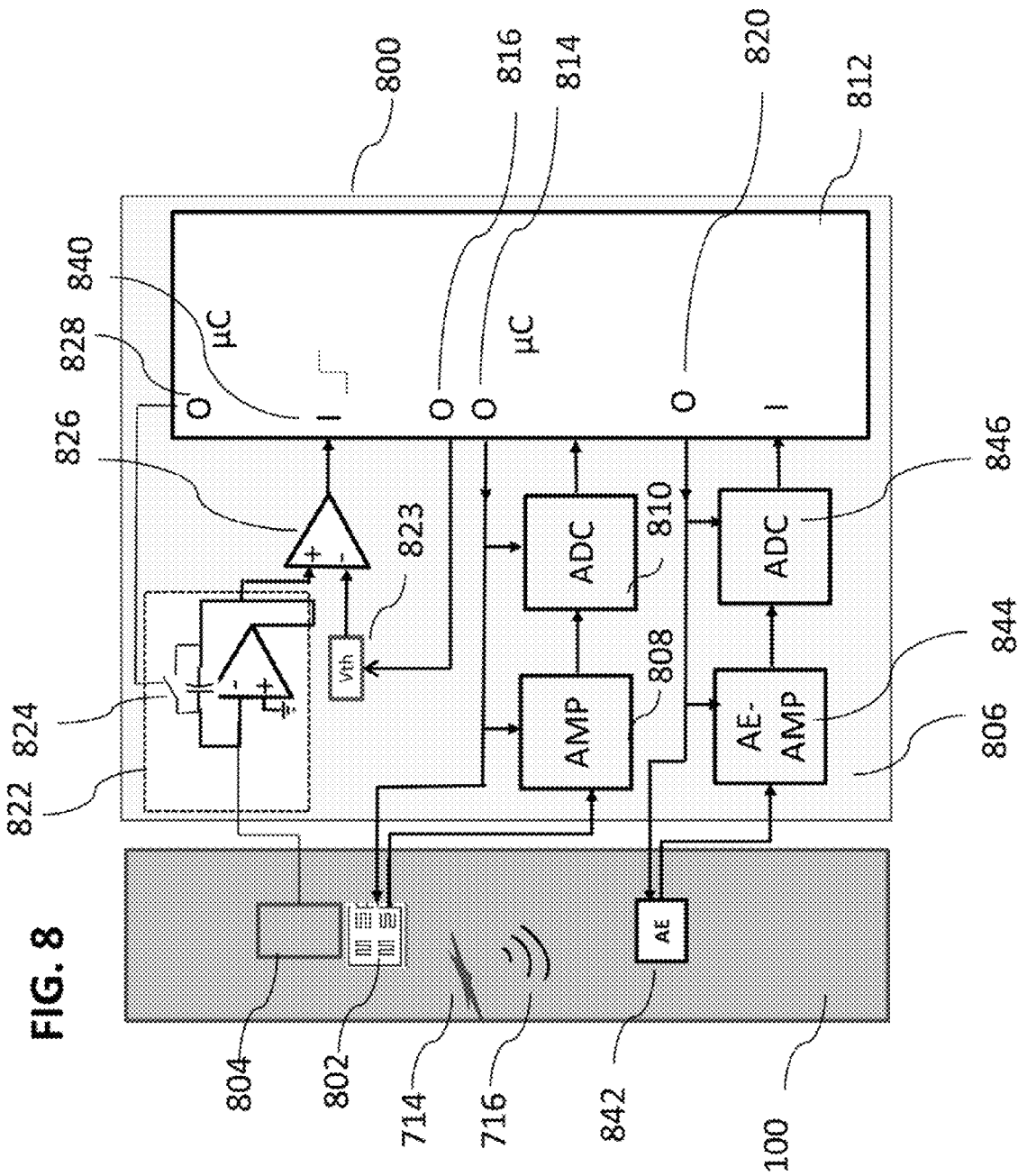

FIGS. 2A-C illustrate a strain measurement device in accordance with one aspect of the present invention, wherein FIG. 2A shows the top view of the device, FIG. 2B is the side view of the device, and FIG. 2C shows an exploded side view illustrating the arrangement of the strain sensing element within the device FIGS. 3A-L illustrate example steps to attach a strain measurement device in accordance with aspects of the present invention to an object;

FIGS. 4A-B illustrate a conventional strain measurement device, and a conventional strain measurement method, wherein FIG. 4A illustrates a conventional device for strain measurement, and FIG. 4B illustrates a conventional method for generating times at which strain is measured in the object;

FIGS. 5A-B illustrate an example continuous strain monitoring device and continuous strain monitoring method by using two strain sensing elements with respect to one aspect of the present invention, wherein FIG. 5A shows an example device, and FIG. 5B illustrates an example method;

FIG. 6 illustrates another example embodiment of a continuous strain monitoring device using two strain sensing elements in accordance with aspects of the present invention;

FIG. 7 shows a conventional method of detecting creation or growth of cracks in an object by monitoring presence of acoustic emission (AE) events in the object;

FIG. 8 illustrates an example device which performs energy efficient monitoring for acoustic emission events in an object by using correlation of acoustic emission events on strain in the object, in accordance with one aspect of the present invention;

FIGS. 9A-B illustrate an example energy efficient acoustic emission (AE) monitoring method by using correlation of acoustic emission events and strain in an object, in accordance to one aspect of the present invention, wherein FIG. 9A illustrates the timing of measuring strain in the object, and FIG. 9B illustrates the timing of activating acoustic emission sensing portions based on strain values; and FIGS. 10A-C show a device for monitoring displacement or existing cracks in an object in accordance with one aspect of the present invention.

DETAILED DESCRIPTION

One aspect of the present invention provides a strain monitoring device that is energy efficient, easy to install on an object, does not miss high strain between successive samples of strain, and uses correlation of strain in an object with occurrence of acoustic emission events to perform a low power monitoring of acoustic emission events The present invention provides a system and method that uses characteristics of strain, strain measurement elements, and correlation of acoustic emission events with strain to monitor strain and/or acoustic emission in an object. Aspects of the present invention are suitable in applications where energy supply of the device is limited, non-limiting examples of which include battery operated devices or applications in which the operating energy of the device is supplied through energy harvesting.

The present invention provides a method and device for strain and acoustic emission monitoring in objects. For easy installation, the device uses a special architecture in which one or more strain sensing element are integrated to the device inside a viewing window. Therefore, installation is simple, easy and fast.

In accordance with one aspect of the present invention, a device is provided in which a combination of a first strain sensing element and a second strain sensing element are used for energy efficient monitoring of strain in an object. The first strain sensing element is a high accuracy element, and it is used to measure strain at discrete time intervals. To save energy, the first strain sensing element is inactive between successive sampling times. To monitor changes of strain between successive samples of strain measured by the first strain sensing element, the present invention uses a second, passive, strain sensing element. If the second strain sensing element detects a strain in the object exceeding a configurable threshold level, a trigger signal is generated, which causes the first strain sensing element to measure strain. Typically, compared to the first strain sensing element, the second strain sensing element is more sensitive to strain but it is less accurate. Often, the second strain sensing element is sensitive to changes in strain while the first strain sensing element it sensitive to absolute value of strain in the object. An example of the first strain sensing element is a foil strain gauge. An example of the second strain sensing element is a piezoelectric film strain gauge.

In accordance with another aspect of the present invention, an energy efficient device and method is provided in which acoustic emission events are monitored in an object. Acoustic emission events indicate creation and growth of cracks in an object. To monitor acoustic emission events, this invention uses Kaiser effect, which states that in an object acoustic emission events do not happen at a given time unless the stress level in the object at that time is as high as the maximum stress experienced in the object. Since stress and strain are often proportional to each other in materials, the current invention offers a method in which the maximum observed strain in an object is calculated, and acoustic emission monitoring portions of the device will be active only at times in which the value of strain is as high as the maximum observed strain in the object. This causes that acoustic emission monitoring portions of the device to be deactivated most of the times, which leads to energy efficiency. Additionally, the present invention offers an embodiment of this method by using a first strain sensing element, a second sensing element and an acoustic emission monitoring portions.

A device in present invention for strain sensing is now described with reference to FIGS. 2A-C.

FIGS. 2A-C illustrate a strain measurement device in accordance with one aspect of the present invention, wherein FIG. 2A shows the top view of the device, FIG. 2B is the side view of the device, and FIG. 2C shows an exploded side view illustrating the arrangement of the strain sensing element within the device.

As shown in FIGS. 2A-B, a strain measurement device 200 includes an electronic portion 202, a strain sensing element 210, wire leads 212 and a strain sensing element window 204. Strain sensing element window 204 includes a frame 206, which frames a window 208. Electronic portion 202 may include an amplifier, power supply (e.g., a battery), offset remover, analog to digital converter (ADC), electronic controller and other electronic circuits for storing strain measurement samples or transmitting strain values to other devices.

Strain sensing element 210 is disposed within strain sensing element window 204. Wire leads 212 connect strain sensing element 210 to electronic portion 202.

A transparent adhesive layer 214 is disposed on the bottom portion of strain measurement device 200. A peel-off mask 216 is disposed on transparent adhesive layer 214.

In accordance with an aspect of the present invention, wires associated with the sensing element are already connected to an electronic signal conditioner. This design makes process of attaching strain measurement device 200 to an object easy, fast and reliable.

While viewing strain measurement device 200 in FIG. 2A, the following items are observed from top to bottom through window 208: transparent adhesive layer 214, strain sensing element 210 and peel-off mask 216. Peel-off mask 216 protects adhesive layer 214 and strain sensing element 210 before strain measurement device 200 is attached to an object.

As shown in FIG. 2C, strain sensing element 210 is arranged to be between peel-off-mask 216 and the adhesive layer 214. Accordingly, by peeling off peel-off-mask 216, strain sensing element 210 will be exposed.

In other embodiments of the present invention, strain sensing element window 204 may be detached from electronic portion 202, while electronic portion 202 is connected to strain sensing element window 204 through a cable. An example in which this embodiment may be desirable is when the geometry of the structure does not allow attachment of the complete device 200 as one piece (e.g., due to limitation in space). Note that strain sensing element window 204 requires a much smaller attachment area on an object compared to the unitary strain measurement device 200.

Because strain measurement device 200 has a compact design, with strain sensing element window 204, in which strain sensing element 210 is already wired to electronic portion 202, attachment of strain measurement device 200 to an object is easy and fast. The procedure to attach strain measurement device 200 to an object will now be described with reference to FIGS. 3A-L.

FIGS. 3A-L illustrate example method to attach a strain measurement device in accordance with aspects of the present invention to an object.

First, as shown in FIGS. 3A-B, the surface of object 100 is cleaned.

Next, as shown in FIGS. 3C-D, paint is removed from the area of object 100 to which strain sensing element 210 is intended to be attached. Removal of paint provides an exposed spot 102 on object 100.

Next, a liquid adhesive may be applied on exposed spot 102. This adhesive may be used to increase the strength of attachment of strain sensing element 210 of strain measurement device 200 to object 100. The liquid adhesive may be used for strong bonding of strain sensing element 210 to structure 100 only at the location of exposed spot 102, while strain measurement device 200 will be attached securely to object 100 using adhesive layer 214.

Next, as shown in FIGS. 3E-F, peel-off mask 216 of strain measurement device 200 is removed. After removal of peel-off mask 216, window 208 of strain measurement device 200 allows for visual adjustment of placement of strain sensing element 210 at exposed spot 102.

Next, as shown in FIGS. 3G-H, pressure is applied to ensure a strong bonding between strain sensing element 210 and object 100. The pressure can be applied by pushing a finger 300 on top of strain sensing element 210 inside window 208 immediately after strain measurement device 200 is attached to object 100. Pressure may only be needed while the liquid adhesive that attaches strain sensing element 210 to exposed spot 102 is being cured. Most commercially available liquid adhesives that are used for attaching strain sensing elements are cured in less than five minutes.

Next, as shown in FIGS. 3I-J, applying a uniform pressure through window 208 during the time that strain gauge is attached may ensure a high quality attachment of the strain sensing element 210 to object 100 on exposed spot 102. Often, the pressure can be applied manually using finger 300.

Alternatively, in cases that strain measurement device 200 is used to measure strain on a ferromagnetic object (e.g., steel), pressure may be applied through window 208 by placing a magnet 302 on strain measurement device 200 at window 208. In this case, the force between magnet 302 and object 100 causes pressure through the window 208, which ensures a strong bonding between the strain sensing element 210 and object 100.

In another embodiment, as shown in FIGS. 3K-L, the pressure can be applied through a permanent or removable spring fixture 304. In this case, a spring is fixed to body of strain measurement device 200 such that it applies pressure through window 208.

The above discussed method for attaching strain measurement device 200 to structure 100 are simpler, easier and faster than attaching conventional strain measurement devices to objects because strain sensing element 210 is packaged into strain measurement device 200, and the attachment does not require making complicated electrical wiring between strain sensing element 210 and the electronic portion 202 of strain measurement device 200 at time of attachment to object 100. Therefore, strain measurement device 200 is suitable for sensing strain in objects where simplicity and speed of attachment are important. Non-limiting example applications include strain measurement on highway bridges, machinery, airframes, buildings, dams, pipelines, etc. Because strain measurement devices are attached in field, simplicity and speed of attachment procedure are key advantages of the strain measurement device in present invention.

Often it is possible to include wireless communication modules in the device 200, therefore, it will be able to measure strain and wirelessly transmit it to other communication equipments such as computers, where strain data will be processed, analyzed or used for monitoring integrity of a structure.

In many applications, there is electrical power limitation in devices that measure strain. Example of such applications is when strain sensing device 200 is operated by a battery.

A conventional method and device fix sensing strain in an object will now be described with reference to FIGS. 4A-B.

FIGS. 4A-B illustrate to conventional strain measurement device, and a conventional strain measurement method, wherein FIG. 4A illustrates a conventional device for strain measurement, and FIG. 4B illustrates a conventional method for generating times at which strain is measured in the object.

As shown in FIG. 4A, a strain sensing device 400 is attached to an object 100. Strain sensing device 400 includes a strain sensing element 402 and an electronic portion 404. Electronic portion 404 includes an amplifier 406, an analog-to-digital converter (ADC) 408 and a controller 410. The output of amplifier 406 is connected to analog to digital converter (ADC) 408. The output of ADC 408 is connected to controller 410.

In FIG. 4A, strain sensing element 402 converts strain in object 100 into an electric quantity such as electric resistance. Therefore, once activated, strain sensing element 402 converts strain in object 100 into a small electric voltage (or an electric current). Often the output of strain sensing element 402 is so weak, it needs to be amplified using amplifier 406, so ADC 408 can convert analog strain values into digital samples. Controller 410 controls strain sensing element 402, amplifier 406 and ADC 408.

In operation, to measure strain, strain sensing element 402 is connected to electronic portion 404. To reduce electrical energy consumption, controller 410 activates strain sensing element 402, amplifier 406, and ADC 408 periodically through output command 412. Therefore, strain measurements are taken only at scheduled times by controller 410. This method is further illustrated FIG. 4B.

As shown in FIG. 4B, a horizontal axis 416 represents time, and a vertical axis 418 represents strain value. A waveform 414 represents strain variation over time for object 100. Strain sensing device 400 measures strain in object 100 at times $T_1$, $T_2$, $T_3$, $T_4$, $T_5$ and $T_6$.

Waveform 414 shows strain variation over time on horizontal axis 416. By using output 412, controller 410 activates strain sensing element 402, amplifier 406, and ADC 408 only at discrete times $T_1$, $T_2$, $T_3$, $T_4$, $T_5$ and $T_6$. Therefore, strain sensing element 402, amplifier 406, and ADC 408 are inactive between successive sampling times to reduce electrical energy consumption of strain sensing device 400.

Because strain sensing element 402, amplifier 406, and ADC 408 are inactive during the time between two successive sampling, the energy consumption of strain sensing device 400 is smaller compared to the situation in which strain sensing element 402, amplifier 406, and ADC 408 are active at all times. However, the change will not be measured or observed by strain sensing device 400 if strain increases or decreases significantly between samples.

For example, FIG. 4B shows that strain value increases significantly after discrete time $T_3$ and reduces before the next strain sample is taken at discrete time $T_4$. In other words, device 400 misses the maximum strain value that happens between discrete times $T_3$ and $T_4$. Missing such a maximum is undesirable, because in most objects and structures, large strain values cause fatigue, which leads to formation of cracks. Therefore, monitoring instances of large strain values is important to predict whether the object is experiencing fatigue.

An energy efficient device and method for sensing strain without missing times at which strain is high, in accordance with aspects of the present invention, will now be described with reference to FIGS. 5A-B.

FIGS. 5A-B illustrate an example continuous strain monitoring device and continuous strain monitoring method using two strain sensing elements with respect to one aspect of the present invention, wherein FIG. 5A shows the example device in accordance with aspects of the present invention for continuous strain monitoring, and FIG. 5B illustrates an example method by which a set of discrete times at which strain in the object is measured in accordance with aspects of the present invention.

FIGS. 5A-B illustrate the strain measurement and monitoring method with respect to one aspect of the present invention. In FIG. 5A, strain on object 100 is monitored using strain sensing device 500.

As shown in FIG. 5A, a strain sensing device 500 is attached to an object 100. Strain sensing device 500 includes a strain sensing element 502 and an electronic portion 506. Electronic portion 506 includes an amplifier 508, an analog to digital converter (ADC) 510 and a controller 512. The output of amplifier 508 is connected to analog to digital converter (ADC) 510. The output of ADC 510 is connected to controller 512. Additionally, FIG. 5A shows a second strain sensing element 504 attached to object 100, which is used to detect changes in strain on object 100.

In FIG. 5A, strain sensing element 502 converts strain in object 100 into an electric quantity such as electric resistance. Therefore, once activated, strain sensing element 502 converts strain in object 100 into a small electric voltage (or an electric current). Often the output of strain sensing element 502 is so weak, it needs to be amplified using amplifier 508, so ADC 510 can convert analog strain values into digital samples. To monitor change in strain of object 100, strain sensing device 500 uses the second strain sensing element 504. By using comparator 520, change in strain of object 100 is compared with a threshold voltage generated by a threshold generator 522. When a significant change in strain of object 100 occurs, comparator 520 produces a trigger signal to controller 512. Controller 512 controls strain sensing element 502, amplifier 508 and ADC 510 via output 514. Additionally, controller 512 sets threshold voltage of threshold generator 522 via output 516.

To measure strain, a first strain sensing element 502 and a second strain sensing element 504 are connected to electronic portion 506. Electronic portion 506 includes amplifier 508, analog to digital converter (ADC) 510, controller portion 512, comparator 520, and threshold generator 522. In order to measure strain, the precision strain sensing element 502 is connected to amplifier 508, which increases the amplitude of signal generated by the first strain sensing element 502. The output of amplifier 508 is connected to ADC 510, which is connected to an input of controller 512. In order to accurately measure strain, the controller 512 activates the first straw sensing element 502, amplifier 508, and ADC 510 from time to time (non-limiting examples of scheduling of strain measurement times include periodic, aperiodic and pseudo random sampling times).

FIG. 5B illustrates occasional strain measurements of strain sensing device 500. In FIG. 5B, waveform 524 shows strain variation in object 100 over time on horizontal axis 526, which represents time, and vertical access 528, which represents strain value.

As illustrated in FIG. 5B, by using output 514, controller 512 activates the first strain sensing element 502, amplifier 508, and ADC 510 only at previously scheduled discrete times $T_1$, $T_2$, $T_3$, $T_4$, $T_5$ and $T_6$. However, the strain value increases between discrete times $T_3$ and $T_4$, will not be observed unless additional sampling is done between discrete time $T_3$, and discrete time $T_4$.

Increasing sampling frequency by controller 512 at all times will be one potential solution, will increase the energy consumption of strain sensing device 500. To monitor the high strain values happening between discrete times $T_3$ and $T_4$, this invention uses the second strain sensing element 504. Compared to first strain sensing element 502, the second strain sensing element 504 is less accurate but more sensitive. Additionally, since the second strain sensing element 504 is more sensitive, for the same amount of strain change, the strain sensing element 504 generates a significantly stronger signal compared to strain sensing element 502.

An example of strain sensing element 502 is a resistive foil strain gauge, and an example of strain sensing element 504 is a piezoelectric strain gauge. An advantage of using piezoelectric strain gauge as strain sensing element 504 is that such strain gauges generate a strong enough signal in response to strain, therefore, its output does not need to be amplified using an amplifier similar to amplifier 508 used to amplify the signal of strain sensing element 502. Additionally, piezoelectric strain sensing elements do not consume electric power. However, compared to other types of strain sensing elements such as foil strain gauges, piezoelectric strain gauges are less accurate, and they do not respond to constant strain levels, which implies that response of a piezoelectric strain sensing element is only to change of strain or dynamic strain, and not the absolute strain level or static strain. Often, change of strain in object 100 causes generation of electric charge during the interval of time that strain change happens, which is equivalent to an electric current at output of second strain sensing element 504, therefore, resistor 523 is used to convert electric current produced by strain sensing element 504 into an electric voltage across resistor 523. When strain increases after discrete time $T_3$, strain sensing element 504 generates a signal that is proportional to the change of strain, as a result, at time, after $T_3$ and before $T_4$, strain change is at such high level that the output signal of strain sensing element 504 exceeds threshold voltage $V_{th}$.

When the output signal of strain sensing element 504 exceeds $V_{th}$, the output voltage of comparator 520 transitions from a low voltage level to a high voltage level (or vise versa). The output of comparator 520 is connected to input 518 of controller 512. Therefore, voltage transition from low to high on input 518 provides a trigger signal that strain on object 100 has exceeded a threshold, upon which controller 512 increases the frequency at which it measured strain.

For accurate strain measurement, controller 512 measures strain more frequently after comparator 520 triggers input 518. As FIG. 5B shows, after time 542 at which output of the second strain sensing element 504 exceeded $V_{th}$, controller 512 measured strain samples at discrete times 544, 546 and 548. This method increases the frequency of strain sensing only when strain is large and fast enough to cause the output of strain sensing element 504 to exceed $V_{th}$. Therefore, the energy consumption of strain sensing device 500 is not increased when strain is low or when strain is not rapidly changing.

In some embodiments of device 500, the value of $V_{th}$ may be fixed (or constant) over time, while in other embodiment, it is configured by controller 512 and it can change from time to time.

Another embodiment of the device for energy efficient sensing and measurement of strain without missing times at which strain is high is now describes with reference to FIG. 6.

FIG. 6 illustrates another example embodiment of a continuous strain monitoring device using two strain sensing elements in accordance with aspects of the present invention.

As shown in FIG. 6, device 500 now uses charge amplifier 600 to convert the signal generated at the output of second strain sensing element 504 into voltage.

As shown in FIG. 6, a charge amplifier (or integrator) can be used to monitor changes in strain of object 100 between the times of strain measurement. In this embodiment, the output signal of strain sensing element 504 is connected to charge amplifier 600. By using comparator 520, output of charge amplifier 600 is compared with a threshold value $V_{th}$.

In FIG. 6, the output of strain sensing element 504 is connected to charge amplifier 600. By using output 604, controller 512 can close switch 602 for a short interval of time, which resets charge amplifier 600. Therefore, the output of charge amplifier 600 at any time will be proportional to change in strain of object 100 since the last time charge amplifier 600 was reset.

An example case in which this embodiment can be used is when strain sensing element 504 is a piezoelectric device. The output of a piezoelectric strain sensing element is an electric charge that is proportional to change of strain in object 100. Therefore, by taking the integral of electric charge at the output of second strain sensing element 504, the output of charge amplifier 600 is proportional to strain in object 100.

The output of charge amplifier 600 is proportional to the integral of the electric charge generated by second strain sensing element 504, therefore, charge amplifier 600 may also be called an integrator. Mathematically, the operation of integration may cause accumulation of noise of offset voltage at the output of charge amplifier 600 resulting in accumulation of error over time. To eliminate this effect, controller 512 uses reset switch 602 which is connected to output 604 of controller 512. Thus the output of charge amplifier 600 is the change in strain readout since it was last reset. Therefore, for best operation, controller 512 may reset charge amplifier 600 every time it reads strain value by activating first strain sensing element 502, amplifier 508, and ADC 510. After resetting charge amplifier 600 controller 512 sets $V_{th}$ accordingly every time it resets charge amplifier 600.

Using such a scheme, the value of strain on object 100 at any given time will be the value of strain that was last measured using first strain sensing element 502, amplifier 508, and ADC 510 plus the output value of charge amplifier 600. Therefore, controller 512 can calculate and set $V_{th}$ in such a way that if strain in object 100 exceeds a threshold of interest, the output of charge amplifier 600 becomes greater than $V_{th}$, causing comparator 520 to generate a trigger signal to input 518, which controller 512 will use as an indicator of times at which it must increase the frequency of measuring strain.

In materials, high strain may lead to cracks (also known as fatigue cracks). Detecting cracks is a very important task when integrity of an object or structure is monitored. Often cracks are monitored by detecting presence of acoustic emission waves. It is very well known that creation and propagation of cracks generate acoustic emission waves. A conventional acoustic emission monitoring device is now described with reference to FIG. 7.

FIG. 7 shows a conventional method of detecting creation or growth of cracks in an object by monitoring presence of acoustic emission (AE) events in the object.

As shown in FIG. 7, device 700 monitors object 100 to detect instances in which a crack 714 is created or grown.

As shown in the figure, an AE sensor 702 is attached to an object 100. Device 700 includes an AE sensor 702, AE amplifier 706, ADC 708, and controller 710. Electronic portion 704 includes an amplifier 706, an analog to digital converter (ADC) 708 and a controller 710. The output of amplifier 706 is connected to analog to digital converter (ADC) 708. The output of ADC 708 is connected to controller 710.

In FIG. 7, AE sensor 702 senses AE waves 716 in object 100 into an electric signal. Often the output of AE sensor 702 is so weak, therefore, it needs to be amplified using amplifier 706, so ADC 708 can take high frequency samples from AE waves 716. Often, because AE waves are high frequency mechanical waves, ADC 708 must take samples at a very high rate, typically 100,000 to 10,000,000 samples per second. AE waves 716 are stress waves that are generated and propagated as a result of sudden release of energy at time crack 714 is generated or grown in object 100. Additionally, AE waves 716 have a relatively high frequency, and depending on materials, their bandwidth may vary from a few KHz up to more than 1 MHz. In order to detect presence of AE waves 716, the AE sensor 702 is connected to electronic portion 704 of device 700.

Electronic portion 704 includes an AE amplifier 706, analog to digital converter (ADC) 708, controller 710. In order to continuously monitor instances in which AE waves 716 are present, AE sensor 702, AE amplifier 706, and ADC 708 must be activated most of the times. As a result, the electrical energy consumption of device 700 is relatively high, and often device 700 is not suitable in applications where object 100 needs to be monitored for very long periods of time (e.g., for months of years) with limited energy supply. In particular, in applications where device 700 is battery operated, its battery may be depleted fast as a result of relatively high electrical energy consumption.

An energy efficient device correlates acoustic emission events with strain is now described with reference to FIG. 8.

FIG. 8 illustrates an example device which performs energy efficient monitoring for acoustic emission events in an object by using correlation of acoustic emission events on strain in the object, in accordance with one aspect of the present invention.

FIG. 8 illustrates an energy efficient method for monitoring acoustic emission (AE) events by using continuous monitoring strain in accordance with one aspect of the present invention. This method uses Kaiser's effect in materials, which states that if an object has experienced a maximum stress level $S_{max}$, then AE events will not happen in the object before the stress level exceeds the previously experienced maximum stress level, $S_{max}$. In materials, stress and strain are uniquely related and are often proportional to each other. Indeed, in most materials, strain is stress divided by a constant known as Young's modulus. This implies that Kaiser's effect states AE events may happen only when strain is equal to or greater than the previously observed strain in a material. Hence, a necessary condition for an AE event to happen is that the observed strain is at least as high as the maximum strain observed in the past. The present invention uses this fact to deactivate AE sensing and signal processing portions until strain is high enough, so AE events are likely to happen.

In FIG. 8 device 800 monitors strain and AE events on object 100.

As shown in FIG. 8, device 800 is attached to an object 100. Device 800 includes a strain sensing element 802 and an electronic portion 806. Electronic portion 806 includes an amplifier 808, an analog to digital converter (ADC) 810 and a controller 812. The output of amplifier 808 is connected to analog to digital converter (ADC) 810. The output of ADC 810 is connected to controller 812. Additionally, FIG. 8 shows a second strain sensing element 804 attached to object 100, which is used to detect changes in strain on object 100. By using second strain sensing element 804, charge amplifier 822, linear comparator 826, and threshold generator 823, device 800 detects instances in which strain on object 100 exceeds a threshold of interest. Additionally, to detect and monitor AE waves 716, device 800 uses AE sensor 842, AE amplifier 844, and ADC 846.

In FIG. 8, strain sensing element 802 converts strain in object 100 into an electric quantity such as electric resistance. Therefore, once activated, strain sensing element 802 converts strain in object 100 into a small electric voltage (or an electric current). Often the output of strain sensing element 802 is so weak, it needs to be amplified using amplifier 808, so ADC 810 can convert analog strain values into digital samples. To monitor changes in strain of object 100, device 800 uses the second strain sensing element 804. Charge amplifier 822 is used to convert signal generated by strain sensing element 804 into an electric voltage that is proportional to the change in strain of object 100 since charge amplifier 822 was reset by controller 812. To reset charge amplifier 822, controller 810 closes switch 824 using output 828 for a short interval of time. By using comparator 826, change in strain of object 100 is compared with a threshold voltage generated by a threshold generator 823. When a significant change in strain of object 100 occurs, comparator 826 produces a trigger signal to controller 812. Controller 812 controls strain sensing element 802, amplifier 808 and ADC 810 via output 814. Also, controller 512 sets threshold voltage of threshold generator 823 via output 814. Moreover, by using output 820, controller 812 controls AE sensor 842, AE amplifier 844 and ADC 846. Electronic portion 806 contains controller 812, amplifier 808, ADC 810, charge amplifier 822, reset switch 824, comparator 826, threshold generator 823, AE amplifier 844, and ADC 846.

For this purpose, first strain sensing element 802 and second strain sensing element 804 and AE sensor 842 are connected to electronic portion 806 of device 800. The strain sensing method in device 800, using two strain sensing elements, is similar to strain sensing method in device 500 explained above. For energy efficient strain measurements, controller 812 of device 800 takes samples of strain using first strain sensing element 802, amplifier 808, ADC 810, by activating them using output 814 at discrete sampling times. To reduce electrical energy consumption of device 800, first strain sensing element 802, amplifier 808, and ADC 810 are inactive between successive discrete sampling times. At the same time, second strain sensing element 804, charge amplifier 822, comparator 826, and threshold generator 823 are used to monitor strain.

In this method, when controller 812 samples strain using strain sensing element 802, amplifier 808, and ADC 810, and based on the value of this latest sample, it immediately calculates $S_{max}$, the maximum observed strain on object 100. Note that $S_{max}$ is simply the greater of the strain sample that was just taken, and the previously calculated maximum observed stain. After calculating $S_{max}$, then controller 812 resets charge amplifier 822 by sending a reset command via output 828 which is connected to reset switch 824 of charge amplifier 822. Also, based on value of $S_{max}$, device controller 812 calculates a new value for $V_{th}$ such that if strain on object 100 exceeds $S_{max}$, then the output of charge amplifier 822 becomes greater than $V_{th}$, which causes comparator 826 to generate a trigger signal on input 840 of controller 812.

Once calculated, controller 812 sets the new $V_{th}$ on threshold generator 823 using output 816. With such arrangement, at any time if the strain level in object 100 exceeds the previously observed maximum strain level $S_{max}$, then a trigger signal is generated on input 840 of controller 812. Upon detecting trigger signal on input 840 which is an indication that the strain on object 100 has exceeded $S_{max}$, controller 812 immediately uses output 820 to activate AE sensor 842, AE amplifier 844, and ADC 846 to monitor presence of AE events. Also, at the same time, controller 812 uses output 814 to activate first strain sensing element 802, amplifier 808, and ADC 810 to accurately measure strain and establish the new $S_{max}$.

Once controller 812 uses output 820 to activate AE sensor 842, AE amplifier 844, and ADC 846 to monitor presence of AE events, it may keep them active for an interval of time or until strain value reduces by a considerable amount below $S_{max}$. During the times at which AE sensor 842, AE amplifier 844, and ADC 846 are activated, creation or growth of crack 714 in object 100 will cause propagation of AE waves 716, which will be detected by device 800.

Details of AE monitoring method in device 800 is now described with reference to FIGS. 9A-B.

FIGS. 9A-B illustrate an example energy efficient acoustic emission (AE) monitoring method using correlation of acoustic emission events and strain in an object, in accordance to one aspect of the present invention, wherein FIG. 9A illustrates the timing of measuring strain in the object, and FIG. 9B illustrates the timing of activating acoustic emission sensing portions based on strain values.

FIG. 9A and FIG. 9B illustrate operation of AE monitoring scheme of device 800 in accordance with one aspect of the present invention. In FIG. 9A, line 900 plots strain on object 100 on a vertical axis 904 and time on a horizontal axis 902. Additionally, the dashed graph 906 shows maximum observed strain on object 100 versus time.

Initially, the strain value is smaller than maximum observed strain, therefore, AE sensor 842, AE amplifier 844, and ADC 846 are not active, and device 800 uses a slow sampling of strain. Such a slow sampling implies taking samples of strain at times 908 and 910; however, at time 912, strain increases to a level high enough, so at this time strain in object 100 exceeds the previously observed strain. This causes comparator 826 to generate a trigger signal on input 840 of controller 812 in device 800.

As a result of strain exceeding maximum observed strain at time 912, controller 812 immediately activates AE sensor 842, AE amplifier 844, and ADC 846 using output 820, to detect potential AE events that could happen. Additionally, at time 912, controller 812 uses output 814 to activate first strain sensing element 802, amplifier 808, and ADC 810 to read the accurate value of strain, and based on that it calculates the new value of $S_{max}$ and calculates the new $V_{th}$ such that if strain in object 100 exceeds the newly calculated $V_{th}$, it causes the output of comparator 826 to generate a trigger signal.

Repetition of this method causes strain to be sampled at a higher sampling rate after time 912 compared to times before time 912. For example, time elapsed between strain sampling times 908 and 910 is significantly larger than time elapsed between sampling times 912 and 914; this is because at times between time 908 to time 910 strain is below maximum observed strain shown by dashed graph 906, but at interval between time 912 and time 914 strain is increasing over time and it has exceeded maximum observed strain shown by dashed graph 906. Strain in object 100 increases until time 916, and after this time, strain in object 100 starts to decrease below maximum observed strain. In this case controller 812 uses output 814 to deactivate AE sensor 842, AE amplifier 844 and ADC 846, which reduces energy consumption in device 800.

Also, after time 916, since strain in object 100 is below maximum observed strain, comparator 826 will not produce any trigger signal for a while. This causes the controller 812 to increase the time between two successive strain samples. For example, from time 916 to time 918 and from time 918 to time 920 the strain in object 100 is below maximum observed strain, but at interval between time 912 and time 914 strain has exceeded maximum observed strain. Therefore, rate of sampling strain at times between time 916 to 920 is decreased compared to times between time 912 to time 916. At time 920, strain in object 100 exceeds maximum observed strain again. This causes increased rate of taking strain samples between time 920 and time 922.

Also, because from time 920 to time 922 strain has exceeded maximum observed strain in object 100, controller 812 activates AE sensor 842, AE amplifier 844, and ADC 846. After time 922, strain in object 100 decreases below maximum observed strain, and for this reason, controller 812 uses output 814 to deactivate AE sensor 842, AE amplifier 844, and ADC 846 after time 922.

Between time 922 and time 930, strain in object 100 remains below the maximum observed strain, AE sensor 842, AE amplifier 844, and ADC 846 after time 922 are inactive, and the rate of measuring strain samples is decreased compared to interval between time 920 to time 922. To further explain this, FIG. 9A shows that times 924, 926, and 928 are times between time 922 to time 930 at which controller 812 uses output 814 to activate first strain sensing element 802, amplifier 808, and ADC 810 to read the accurate value of strain; however, since in interval 922 strain on object 100 is below maximum observed strain, the time between successive samples is large compared to the time between successive strain samples in interval from time 920 to time 922 in which strain has exceeded maximum observed strain.

Finally, at time 930, once again strain in object 100 exceeds maximum observed strain. This causes controller 812 to activate AE sensor 842, AE amplifier 844, and ADC 846. Additionally, rate of measuring strain in interval from time 930 to time 932 is increased compared to times before time 930 and after time 922. After time 932, strain in object 100 decreases below maximum observed strain. As a result, controller 812 uses output 814 to deactivate AE sensor 842, AE amplifier 844, and ADC 846 after time 932. As shown in FIG. 9A, rate of measuring strain is decreased after time 932, compared to rate of measuring strain in interval from time 930 to time 932.

FIG. 9B shows AE events in object 100 and active times of AE sensor 842, AE amplifier 844, and ADC 846. In FIG. 9B, AE event 948, AE event 950 and AE event 952 are shown on horizontal axis 902 representing time and vertical axis 940 representing relative energy of AE event. Also, shown in FIG. 9B are intervals 942, 944, and 946 in which AE sensor 842, AE amplifier 844, and ADC 846 are active.

Note that interval 942 is from time 912 to time 916 in which strain in object 100 exceeds maximum observed strain. Similarly, interval 944 is from time 920 to time 922 in which strain in object 100 exceeds maximum observed strain. Also interval 946 is from time 930 to time 932 during which strain in object 100 exceeds maximum observed strain. For this reason, AE sensor 842, AE amplifier 844, and ADC 846 are active only during intervals 942, 944, and 946, and at rest of the times, sensor 842, AE amplifier 844, and ADC 846 are inactive.

By deactivating AE sensor 842, AE amplifier 844, and ADC 846 during times that strain is below maximum observed strain, device 800 becomes energy efficient. Also, because of Kaiser effect, device 800 does not miss any AE events during such intervals in which AE sensor 842, AE amplifier 844, and ADC 846 are inactive. This is because Kaiser effect implies that AE events do not happen when strain, is below maximum observed strain in that object.

Since maximum observed strain is an increasing function over time, as time goes on, the threshold of strain for turning on, AE sensor 842, AE amplifier 844 and ADC 846 increases. Therefore, it is expected that as times goes on, AE sensor 842, AE amplifier 844, and ADC 846 would become active less frequently. This increases energy efficiency of device 800.

Device 800 is suitable to detect formation or growth of a crack in an early development stage; however, once a crack is developed, expansion of a crack cannot be monitored by using device 800. A device for monitoring three dimensional relative movement of cracks (or joints) is now described with reference to FIGS. 10A-C.

FIGS. 10A-C illustrate a device for three dimensional monitoring of cracks and displacement in an object with respect to one aspect of the present invention.

FIGS. 10A-C show a device for monitoring displacement of existing cracks in an object in accordance with one aspect of the present invention. In FIG. 10A, device 1000 is used to monitor any change in status of crack 1002 in object 100.

As shown in FIGS. 10A-C, device 1000 is attached to an object 100 to monitor crack 1002. Device 1000 includes magnetic orientation sensors 1014, 1016, 1018, and 1020. To monitor crack 1002, device 100 uses magnet 1004, which is installed on object 100 using base 1006.

In FIGS. 10A-C, magnetic orientation sensors 1014, 1016, 1018, and 1020 sense the orientation of magnetic field of magnet 1004. Therefore, any 3-dimensional change in crack 1002 causes change in relative position of magnet 1004 with respect to magnetic orientation sensors 1014, 1016, 1018, and 1020. Therefore, by using geometric equations, device 100 calculates the geometry of crack 1002.

For this purpose, device 1000 is installed on object 100 on one side of crack 1002, and a magnet 1004 is attached to other side of the crack 1002 on object 100. Attachment of magnet 1002 to object 100 is by using a base 1006. To monitor a change in crack 1002 along any of three dimensions, x axis 1008, y axis 1010, and z axis 1012, device 1000 uses an array of magnetic field orientation sensors 1014, 1016, 1018, and 1020, which are sensitive to the direction of magnetic field that passes through them. FIG. 10B shows top view of device 1000. Any change or growth of crack 1002 causes the position of magnet 1004 change with respect to magnetic field orientation sensors 1014, 1016, 1018, and 1020. As a result, by using geometric calculation device 1000 calculates relative change in crack 1002 along any of three axes 1008, 1010, and 1012. FIG. 10B shows the top view of device 1000 installed on object 100.

FIG. 10C shows the method by which device 1000 displacement or motion in three dimensions. Magnetic field orientation sensors 1014 and 1016 measure orientation angles $\theta_1$ and $\theta_2$. Using separation distance d between magnetic field orientation sensors 1014 and 1016 (which is distances of magnetic field orientation sensors 1014 and 1016), device 100 calculates displacement along x axis 1026 by using the following equation: $X=d\ \tan(\theta_1)(\tan(\theta_1)+\tan(\theta_2))$. Also device 100 calculates displacement along y axis 1028 by using the following equation: $Y=d\ \tan(\theta_2)(\tan(\theta_1)+\tan(\theta_2))$.

In a similar way, device 100 uses the measurements of magnetic field orientation sensors 1018 and 1020 in order to calculate the displacement along z axes 1012 and x axis 1008.

Conventional strain sensing devices suffer from complexity of strain attachment procedure, and often, attaching a strain sensing element in field is difficult due to the complicated procedure for attachment and wiring of a strain sensing element. For easy and fast attachment of a strain sensing device, aspects of the present invention include a device in which one or two strain sensing elements are already integrated and prewired into the electronic portion of the device. A layer of transparent adhesive makes attachment of the device easy, simple and fast. For easy attachment, the strain sensing elements of the device in accordance with aspects of the present invention are arranged to be inside a window, which enables careful adjustment of the strain sensing element to the location in an object at which strain is intended to be monitored.

A shortcoming of conventional strain sensing methods is that often, a device using such methods takes samples of strain at discrete times. In most applications, because the energy supply of a strain sensing device is limited, the time between successive samples may be long. Therefore, if strain changes significantly between two successive times at which samples of strain are being taken, the change may not be detected by the device.

In order to measure strain in objects by using devices that have a limited energy supply (e.g., battery operated devices), aspects of the present invention provide a method in which two strain sensing elements are used. A first strain sensing element is used to perform accurate measurement of strain at discrete times. In order to monitor strain between two successive times at which strain is sampled using the first strain sensing element, methods in accordance with aspects of the present invention use a second strain sensing element. The signal of the second strain sensing element is used to generate a trigger signal in cases where strain in the object changes significantly, or when the strain exceeds a threshold. A non-limiting example of the first strain sensing element is an accurate foil strain gauge and a non-limiting example of the second strain sensing element is a high sensitivity piezoelectric strain gauge.

Often, increased strain in objects may lead to initiation of growth of cracks. In materials, acoustic emission waves are generated at any time that cracks are generated or propagated. Therefore, by monitoring the presence of acoustic emission waves, initiation and growth of cracks can be detected. A conventional acoustic emission monitoring method requires a relatively sensitive acoustic emission sensor, an acoustic emission amplifier, and other electronic modules such as analog to digital converters, which collectively consume a relatively large electric power. As a result, conventional acoustic emission monitoring methods are not suitable in devices where energy supply is limited (e.g., battery operated devices). Another shortcoming of conventional acoustic emission monitoring methods is that they produce too many false detections, because they could misinterpret background noise of waves generated by sources other than cracks as acoustic emission events.

To overcome the high electric power conversion issue of conventional acoustic monitoring methods, aspects of the present invention provide a method in which a strain sensing element is used to monitor strain and to activate acoustic emission monitoring portions only when strain is high. This energy efficient acoustic emission monitoring method in accordance with aspects of the present invention is based on Kaiser effect, which states that if a material has already experienced a given level of stress (or strain) in the past, acoustic emission events will not happen in that material at any stress for strain) below that level.

In addition to being energy efficient, another important advantage of acoustic emission monitoring in accordance with aspects of the present invention is that it reduces the probability of false detections. This is because methods in accordance with aspects of the present invention concurrently monitor strain and acoustic emission events. Therefore, falsely detection of acoustic emission events that could happen attunes when strain is low are avoided.

The foregoing description of various preferred embodiments of the invention have been presented for purposes of illustration and description it is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device for monitoring strain in an object, said device comprising:
   a strain measurement portion operable to measure strain in the object;
   an adhesive layer disposed on said strain measurement portion; and
   a peel-off mask disposed on said adhesive layer,
   wherein said strain measurement portion comprises a body, a transparent window portion, a strain measurement device and a signal processing portion,
   wherein said body includes an attachment surface,
   wherein said adhesive layer is disposed on said attachment surface for attachment of said body to the object,
   wherein said transparent window portion is arranged to enable viewing of a portion of the object through said body, wherein said strain measurement device is disposed within said transparent window portion and operable to generate a strain signal based on strain in the object, and wherein said signal processing portion is operable to generate a processed signal based on the strain signal.

2. The device of claim 1, wherein said strain measurement portion further comprises a wireless communication module operable to transmit a transmission signal based on the processed signal.

3. The device of claim 1, wherein said strain measurement portion further comprises a second strain measurement device operable to generate a trigger signal based on the strain of the object, and wherein said strain measurement device is operable to activate based on the trigger signal.

4. The device of claim 3, wherein said second strain measurement device consumes less power than said strain measurement device.

5. The device of claim 3, wherein said strain measurement device comprises a static strain measurement device, and wherein said second strain measurement device comprises a dynamic strain measurement device.

6. The device of claim 3, wherein said strain measurement device comprises a foil strain gauge, and wherein said second strain measurement device comprises a piezoelectric strain gauge.

7. The device of claim 3, further comprising an acoustic emission detector operable to detect a formation or growth of a crack in the object.

8. The device of claim 7, wherein said acoustic emission detector is operable to activate based on the trigger signal.

9. A method of monitoring an object, said method comprising:

measuring, via a strain measurement device, a first strain of the object at a first time;

generating, via the strain measurement device, a trigger signal when the first strain of the object exceeds a predetermined threshold;

activating, via the trigger signal, a second strain measurement device; and measuring, via the second strain measurement device, a second strain of the object at a second time.

10. The method of claim 9, wherein said generating, via the strain measurement device, a trigger signal when the first strain of the object exceeds a predetermined threshold comprises generating the trigger signal when the first strain of the object exceeds the predetermined threshold based on a maximum strain or stress level the object can experience before acoustic emissions are generated as a result of creation or growth of cracks.

11. The method of claim 9, further comprising detecting, via an acoustic emission detector, formation or growth of a crack in the object.

12. The method of claim 11, wherein said detecting, via an acoustic emission detector, formation or growth of a crack in the object comprises activating the acoustic emission detector via the trigger signal.

13. The method in claim 9, wherein said measuring, via a strain measurement device, a first strain of the object at a first time comprises measuring, via a dynamic strain measurement device, the first strain of the object at the first time, and wherein said measuring, via the second strain measurement device, a second strain of the object at a second time comprises measuring, via a static strain measurement device, the second strain of the object at the second time.

14. The method claim 9, wherein said measuring, via a strain measurement device, a first strain of the object at a first time comprises measuring, via a piezoelectric strain gauge, the first strain of the object at the first time, and wherein said measuring, via the second strain measurement device, a second strain of the object at a second time comprises measuring, via a foil strain gauge, the second strain of the object at the second times.

15. The method of claim 9, wherein said generating, via the strain measurement device, a trigger signal when the first strain of the object exceeds a predetermined threshold comprises generating the trigger signal when the first strain of the object exceeds the predetermined threshold based on a maximum strain measured in the object over time.

16. The method of claim 15, further comprising detecting, via an acoustic emission detector, formation or growth of a crack in the object.

17. The method of claim 16, wherein said detecting, via an acoustic emission detector, formation or growth of a crack in the object comprises activating the acoustic emission detector via the trigger signal.

* * * * *